Apr. 24, 1923.
W. D. RICHARDSON
STEERING MECHANISM STABILIZING DEVICE
Filed Dec. 12, 1921
1,452,656
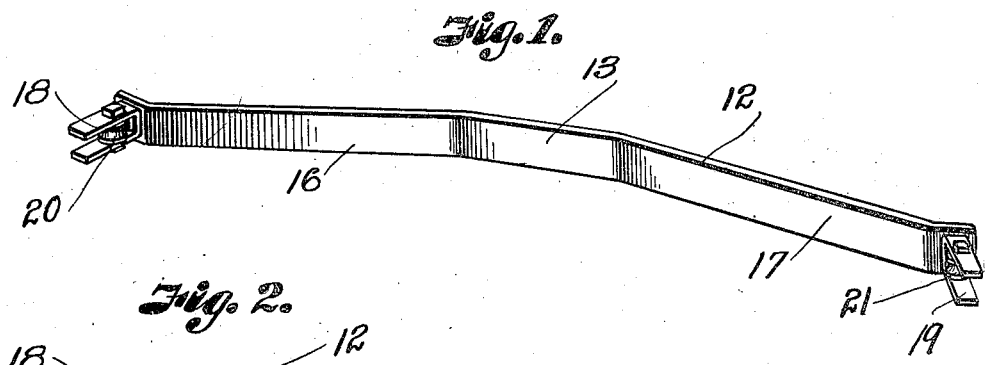
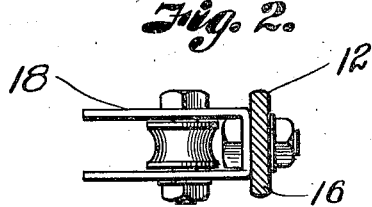
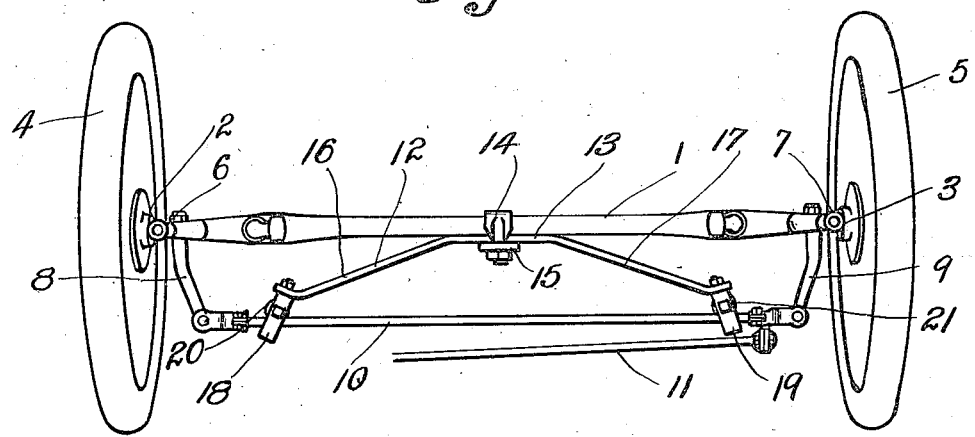
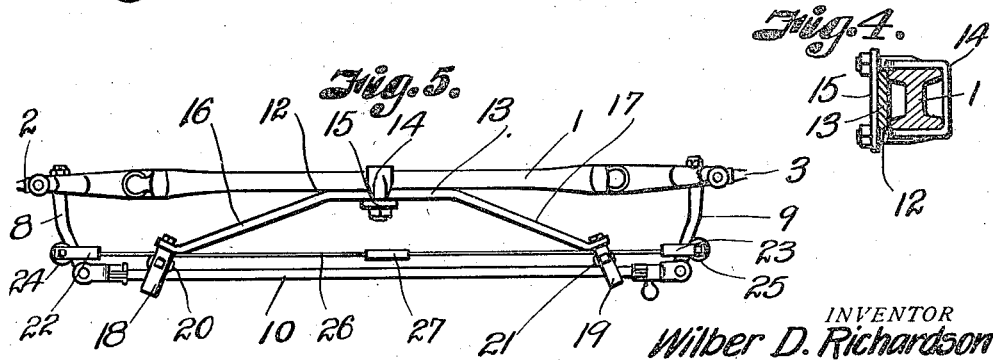
INVENTOR
Wilber D. Richardson
BY
ATTORNEY Patented Apr. 24, 1923.

1,452,656

UNITED STATES PATENT OFFICE.

WILBER D. RICHARDSON, OF ROSEDALE, KANSAS, ASSIGNOR OF ONE-HALF TO RALPH BRYANT, OF KANSAS CITY, MISSOURI.

STEERING-MECHANISM-STABILIZING DEVICE.

Application filed December 12, 1921. Serial No. 521,709.

*To all whom it may concern:*

Be it known that I, WILBER D. RICHARDSON, a citizen of the United States, residing at Rosedale, in the county of Wyandotte and State of Kansas, have invented certain new and useful Improvements in Steering-Mechanism-Stabilizing Devices; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a steering stabilizing device adapted to be attached to a known type of motor vehicle in such a manner that the steering mechanism will be stabilized to prevent undue wobbling of the wheels due to the vibration over uneven roadbeds.

Where the steering wheels are controlled from a steering post they are liable to weave due to the fact that the roadbed is uneven, so the vibrations act to swing the wheels away from the direction in which it is intended to steer the vehicle. As a result, the driver must continually operate the steering wheel to keep the vehicle headed in the direction which he intends to drive.

My invention contemplates the provision of means whereby the steering mechanism will be stabilized so that when it is set for a determined direction, there will be very little, if any, tendency to change the direction of travel of the car and it is an important feature of the invention that it may be attached to known types of motor vehicles without changing the construction of the vehicle in any way.

The advantages of the invention, together with the novel details of construction, will be understood by reference to the following description in connection with the accompanying drawings, in which—

Fig. 1 is a perspective view of a stabilizing attachment constructed in accordance with my invention.

Fig. 2 is a cross sectional view through the same.

Fig. 3 is a plan view of a motor vehicle steering means with the axle and wheels secured on the spindles to which my invention is applied.

Fig. 4 is a cross sectional view through the axle and the stabilizing attachment, the means for securing the two together being shown in end view, and Fig. 5 is a plan view of a slightly modified form of my invention.

I have shown the invention as applied to the front axle and the steering mechanism of a motor vehicle, such as is now being manufactured by the Ford Motor Company of Detroit, Michigan.

The axle 1 is shown as consisting of an I-beam, on the ends of which are the wheel-receiving spindles 2 and 3, upon which the front wheels 4 and 5 are mounted. The spindles are secured to the ends of the axle by knuckles 6 and 7, as is well understood, and the spindles carry rearwardly extending complementary steering arms 8 and 9 connected at their rear ends by a steering connecting rod 10, operated from the steering post through the medium of a steering drag link 11, the construction thus far described being a known type of motor vehicle construction.

With such a construction, the wheels are apt to weave or vibrate sidewise so as to get out of line and as a result, the car is hard to steer on very rough roads and the steering wheel must be continually manipulated to keep the car moving in a determined direction.

My invention contemplates means for preventing this objectionable condition and is shown as consisting of a stabilizing bar 12, the intermediate portion 13 of which may be fastened to the rear face of the axle 1 by a U-bolt 14 and the plate 15, as will be well understood.

Extending rearwardly and outwardly from the intermediate portion are two ends or arm members 16 and 17, having on their extremities U-shaped brackets 18 and 19, between the parallel arms of which are mounted friction rollers 20 and 21, adapted to bear against the steering connecting rod, as clearly shown in Fig. 3. The arms 16 and 17 have sufficient resiliency to allow them to slightly give when the steering connecting rod is reciprocated in either direction by the steering drag link 11. The friction rollers bear against the steering connecting rod with sufficient pressure to hold it against longitudinal movement, due to the vibration of the vehicle parts so that the rod 10 is held rigid enough to prevent weaving or sidewise vibration of the wheels 4 and 5.

There is not sufficient pressure, however, to seriously interfere with the proper manipulation of the steering mechanism, it being obvious that when the steering post is turned to cause its arm (not shown) to actuate the steering drag link, a reciprocatory motion can be imparted to the steering connecting rod either to the right or to the left, and that when it has been so actuated, it will be held against further accidental movement by the pressure of the rollers 20 and 21 against the steering connecting rod. Therefore, the driving of the motor vehicle can be more easily accomplished than is possible where all of the vibration from the roadbed is communicated up through the wheels, through the arms 8 and 9 to the steering connecting rod, the steering post, and the wheel.

In Fig. 5 I have shown a slightly modified arrangement in which, in addition to the mechanism described, I may utilize roller supporting brackets 22 and 23, carrying rollers 24 and 25, the brackets being sleeved over the arms 8 and 9 so that the rollers 24 and 25 will bear against their outer edges and since the brackets are connected by a cable or rod 26, having a slack adjusting turnbuckle 27, it will be apparent that the two arms 8 and 9 will be connected together so that in the event that the steering connecting rod 10 should break, the arms will be held in position so that the wheels cannot swing inwardly and cause an accident.

The connecting member 26 is shown as passing through the spaces between the rollers 20 and 21 and the rear ends of the brackets 18 and 19, the brackets being secured to the stabilizer in the same manner as described in connection with Figs. 1 to 4.

From the foregoing it will be apparent that the device constituting my invention may be readily applied to any existing type of car without in any way changing the general organization of the car and that it will hold the steering connecting rod with sufficient firmness to prevent weaving of the wheels or permitting them to vibrate out of line, thereby facilitating the steering of the motor vehicle as it travels over the roadbed.

It will also be observed that since the ends of the stabilizer bear against the steering connecting rod, enough tension will be put upon the knuckles to eliminate the liability of rattling when the knuckle connections become slightly worn, the tension also being sufficient to take up the wear at the knuckle joint.

What I claim and desire to secure by Letters-Patent is:

1. A stabilizer for steering devices for motor vehicles comprising a bar having outwardly projecting, inclined, yielding arms, brackets on the ends of the arms, and steering connecting rod engaging rollers in the brackets.

2. A stabilizer for steering devices for motor vehicles comprising a flat bar having a straight intermediate portion for attachment to the front axle of a motor vehicle, rearwardly and outwardly inclined arms yieldingly connected thereto, and steering connecting rod engaging means on the ends of the arms, said means comprising U-shaped brackets fastened to the ends of the arms, and friction rollers mounted in the brackets.

3. In combination with the front axle of a motor vehicle and the steering mechanism supported thereby including steering arms and a steering connecting rod connecting them of a stabilizing member comprising a bar secured to the front axle intermediate its ends and having rearwardly and outwardly inclined yielding arms, means on the ends of the arms for bearing against the steering connecting rod of the steering mechanism to hold the same substantially rigid when it is set in steering position, additional stabilizing means bearing on the outer edges of the steering arms, and means for connecting the second mentioned stabilizing means.

4. A stabilizer for steering devices for motor vehicles comprising a flat bar having inclined arms projecting from the middle portion thereof, U-shaped brackets carried by the ends of the arms, and idle friction rollers mounted between the arms of the U-shaped brackets.

5. A stabilizer for steering devices for motor vehicles comprising a bar having oppositely disposed, inclined, yielding arms, and means on the arms for direct frictional engagement with the side of the connecting rod of the steering mechanism to exert pressure thereagainst in a direction at right angles to the length of the rod.

In testimony whereof I affix my signature.

WILBER D. RICHARDSON.